Figure 1:
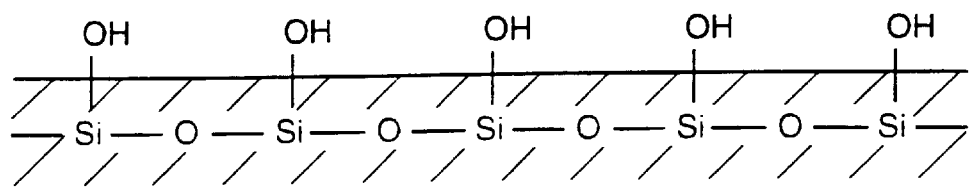

United States Patent [19]
Hofmann

[11] Patent Number: 5,945,373
[45] Date of Patent: Aug. 31, 1999

[54] SURFACE MODIFICATION OF SILICA AND PRODUCTS THEREOF, PARTICULARLY CHROMATOGRAPHY MEDIA

[75] Inventor: Martin J Hofmann, Gloucester, United Kingdom

[73] Assignee: Downstream Media Limited, Bristol, United Kingdom

[21] Appl. No.: 08/849,045
[22] PCT Filed: Nov. 27, 1995
[86] PCT No.: PCT/GB95/02763
§ 371 Date: Jul. 22, 1997
§ 102(e) Date: Jul. 22, 1997
[87] PCT Pub. No.: WO96/16733
PCT Pub. Date: Jun. 6, 1996

[30] Foreign Application Priority Data

Nov. 25, 1994 [GB] United Kingdom .................. 9423833

[51] Int. Cl.[6] .................................................. B01J 20/10
[52] U.S. Cl. ........................................ 502/407; 502/401
[58] Field of Search .................................. 502/401, 407

[56] References Cited

U.S. PATENT DOCUMENTS

| | | | |
|---|---|---|---|
| 2,273,040 | 9/1942 | Iler et al. ................................. | 91/68 |
| 3,886,070 | 5/1975 | Martineau et al. ....................... | 210/47 |
| 4,520,122 | 5/1985 | Arena ..................................... | 502/152 |

FOREIGN PATENT DOCUMENTS

| | | | |
|---|---|---|---|
| 0 297 901 | 1/1989 | European Pat. Off. ......... | B01J 20/12 |
| 707950 | 4/1954 | United Kingdom . | |
| WO 87/06492 | 11/1987 | WIPO ............................ | B01D 15/08 |
| WO87/06492 | 11/1987 | WIPO ............................ | B01D 15/08 |

OTHER PUBLICATIONS

Patents Abstracts of Japan, vol. 12, No. 56 (C–477) & JP A 62 201640 (Daicel Chem. Ind.) Sep. 5, 1987.
Patent Abstracts of Japan, vol. 13, No. 171 (C–588) & JP A 64 003130 (Daicel Chem. Ind.) Jan. 6, 1989.

*Primary Examiner*—Michael Lewis
*Assistant Examiner*—Alexander G. Ghyka
*Attorney, Agent, or Firm*—Pearne, Gordon, McCoy & Granger LLP

[57] ABSTRACT

A method for treating silica to render its surface non-polar, especially for use as a chromatography medium in "reverse phase" chromatography. The silica is treated with a solution of a complex in which a hydrocarbon chain is coordinated, e.g. through a carboxylic group, with a metal ion such as chromium. The complex also has halide ligands, which on hydrolysis give rise to cationic charging and hydroxyl-bridging of the complex molecules with the silica surface and with one another. Elimination of water binds the molecules onto the silica surface where their hydrocarbon chains give the desired non-polar properties.

5 Claims, 1 Drawing Sheet

SURFACE MODIFICATION OF SILICA AND PRODUCTS THEREOF, PARTICULARLY CHROMATOGRAPHY MEDIA

FIELD OF THE INVENTION

This invention relates to processes for modifying the surface chemistry of silica and to silica products so modified. A particular application is to silica packing media for chromatographic applications, specifically the preparation of a "reverse phase" silica medium.

BACKGROUND

Chromatography is a widely used technique for separating mixtures. Generally it involves two relatively moving phases, e.g. a stationary phase (solid) and a mobile phase (fluid). "Normal phase" chromatography uses a polar stationary phase and a non-polar mobile phase. In "reverse phase" chromatography the stationary phase is non-polar. A common stationary phase is silica; particulate amorphous silica. Reverse phase chromatography conventionally uses silica which has been modified by covalent attachment of long hydrocarbon chains to give a non-polar surface. This "reverse phase" silica is protected from hydrolysis in aqueous mobile phases because of the absence of polar interactions at its surface; the consequent use of aqueous mobile phases permits a variety of new separations. This is important in the medical field where many compounds are at least to some extent soluble in water, and includes analytical chromatography techniques such as thin layer chromatography (TLC).

However, reverse phase chromatography is often avoided for reasons of expense. Reverse phase silica media are up to ten times as expensive as their normal phase counterparts, because of the multi-step reactions with various silanes involved in manufacture.

THE INVENTION

We have found a new and simple process for treating the surface of silica to render it essentially non-polar, and usable to convert a 'normal' particulate silica chromatography medium into a 'reverse phase' medium.

We use a metal complex which has a hydrocarbon chain coordinated with the metal ion through a ligand moiety, and other ligands which enable reaction with the silanol groups at the silica surface to bind the metal ion and its attached hydrocarbon chain to that surface, and also preferably enable reaction between adjacent complex molecules to bind them together over the surface.

The hydrocarbon chain preferably has at least 7, more preferably at least 9 and most preferably at least 12 carbon atoms. Alkyl chains are preferred. It confers relatively non-polar properties on the resulting silica surface. Its ligand moiety is generally some electron-donor group such as an oxygen-containing group e.g. a carboxylic or carboxylate group: it may conveniently be a fatty acid. It may coordinate with more than one metal ion: carboxylate can coordinate with two, for example.

Other entities coordinated to metal ion are preferably electronegative entities susceptible to forming anions in solution on hydrolysis (or neutralisation by base) of the complex. This enables the complex to acquire a positive charge in solution, believed to be significant in achieving reaction with the silica surface. It can also assist the formation of bridges e.g. hydroxyl links between complex and silica silanol, and between adjacent complexes: these links can eliminate solvent on curing to form permanent bonds via oxygen.

Halide ligands are preferred, especially Cl, Br, I.

The metal ion is preferably a transition metal ion: chromium (III) has been found suitable but others may be used provided that they can coordinate the appropriate ligands in such a way that the required binding reactions can occur.

PREFERRED AND OPTIONAL FEATURES

A preferred complex is representable (omitting associated solvent molecules such as water and/or alcohol) by the formula:

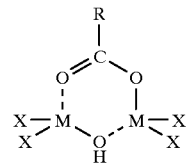

in which M is a trivalent transition metal ion such as Cr (III), R is a hydrocarbon chain, preferably of at least seven and more preferably at least twelve carbon atoms, and X is halogen other than fluorine.

In aqueous or alcoholic solution solvent molecules can coordinate e.g. thus:

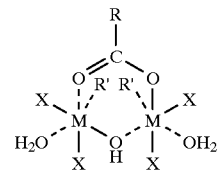

where R' is water or alcohol. Further hydrolysis/neutralisation frees $X^-$ anions and coordinates further solvent; solvent groups can then lose protons and react with adjacent —OH— carrying entities by coordination followed by elimination of water, giving —O— bonds to adjacent complexes and to the silica surface.

Preferred reaction conditions use the complex in a solution e.g. alcoholic, aqueous or aqeous/alcoholic) adjusted to give a degree of preliminary association or polymerisation of the complex in solution, but without precipitation.

Figure 2:
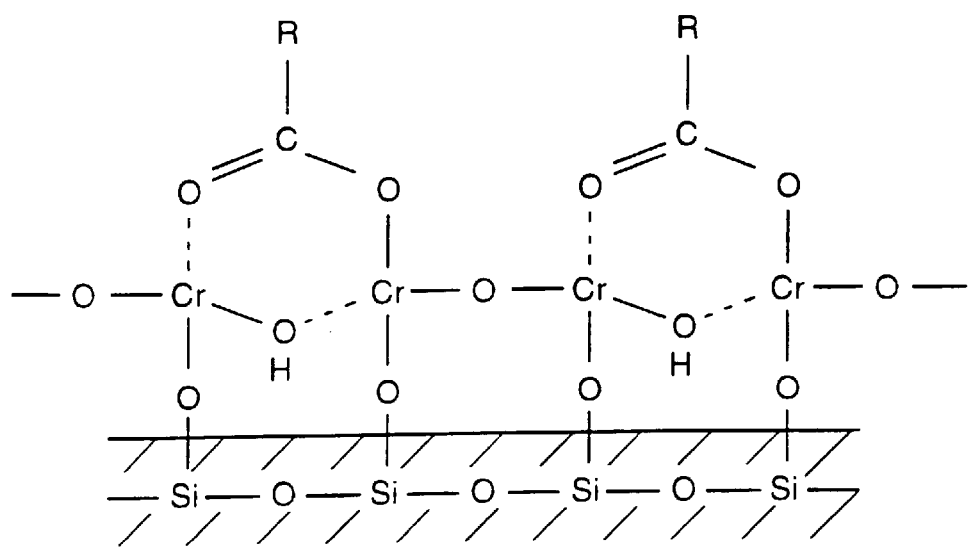

See FIGS. 1 and 2, in which FIG. 1 shows (schematically) silanol groups on the surface of normal silica before treatment, and FIG. 2 shows (schematically) the surface after treatment with a fatty acid/hydroxy/chromium (III) complex as proposed herein, and after the elimination of water to form permanent bonds.

Suitable complexes are available commercially, for example the fatty acid/hydroxy/chromium (III) chloride complexes available from Du Pont as Quilon (Registered Trade Mark). These complexes, provided in isopropanol solutions which can be diluted with water as desired, accord with the formula

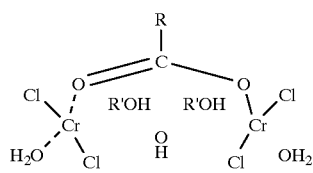

where R is $C_{14}$ to $C_{18}$ alkyl and R'OH is isopropanol. Materials treated with these are approved for use in contact with food and drugs. Their cost is vastly less than that of the conventional treatments used to create reverse phase silica.

The treatment is generally by contacting the silica surface with the solution of complex, optionally followed by wet heating, and then drying, optionally with heating. Particulate silica may be treated in bulk. In some cases care needs to be taken (e.g. use of agitation, fluidisation) to avoid particles sticking together. Another possibility is to treat a packed column or prepared plate of normal silica chromatography medium in situ: with columns this may reduce problems with poor packing efficiency sometimes encountered with conventional "reverse phase" silica media.

Particulate silica is preferably dried before treatment, e.g at >100° C. for >5 hours. After wetting with the treatment complex, heating may be used e.g. at from 60° to 100° C., to assist reaction. Excess treatment solution may be washed out before or after heating. Then, dry the treated silica e.g. at >100° C.

Aspects of the invention include the methods described and also the surface-treated silica products obtained thereby, especially particulate (amorphous) silica chromatography media.

EXAMPLES

The examples determined the effect of treating normal silica TLC plates with trivalent chromium complexes. As a treatment agent we used various of the Quilon® chromium complexes mentioned above.

Quilon is available in five grades. Each grade contains different amounts of chromium, chlorine and fatty acid. Different chain lengths of fatty acid are also used. Quilon C is pentahydroxy (tetradecanoato) dichromium.

Grades H and M are both tetradecanoato chromic chloride hydroxide (1:2:4:1) but vary in their active ingredient concentration (H being the stronger).

Grades S and L are octadecanoato chromic chloride hydroxide (1:2:4:1) and again they differ in strength, L being the stronger.

The chromium, chlorine and fatty acid contents of the five grades (including isopropanol solvent) are shown in the table below (taken from Du Pont's product information).

| | Grade | | | | |
|---|---|---|---|---|---|
| wt % content of | C | H | L | M | S |
| Chromium | 5.7 | 9.2 | 9.2 | 5.7 | 5.7 |
| Chloride | 7.8 | 12.6 | 12.7 | 7.8 | 7.8 |
| Fatty Acid | 11.8 | 19.0 | 21.2 | 11.7 | 14.8 |

Reactivity of the chromium portion of the complex is determined by the degree of hydrolysis and polymerisation. Quilon H, L, M and S are monomeric and react readily with negatively charged materials. The chromium complex in Quilon C is more polymerised and bonds to substrate surfaces at lower curing temperatures; it also bonds more readily from organic solvents.

As a control, normal phase TLC plates were used to develop a chromatograph of a mixture of two food dyes. The mobile phase was pure methanol.

Similar normal phase TLC plates were treated with diluted aqueous solutions of about 10 wt % of Quilon. In practice, concentrations of the complex from 1 to 20 wt % are typical. Different grades of Quilon were used. The treated plates were dried. Some plates were dried with warm air, others hot air cured and others left to dry at 20° C. The mixture of food dyes was applied and the chromatographs developed in pure methanol.

In each case the elution order of the dyes for the normal phase TLC plates was the reverse of that with the treated TLC plates, showing that 'reverse phase' silica had been produced.

Further, the plates treated with 'Quilon C' required only gentle warm-air drying to achieve a complete conversion to water repellent "reverse phase" properties. The processing was therefore extremely simple.

I claim:

1. A method of making a particulate amorphous silica chromatography medium having a non-polar surface, comprising:

(i) treating particulate amorphous silica, having a surface including silanol groups, with a solution of a chromium (III) complex of the following formula:

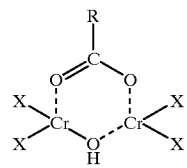

wherein:

X is Cl, Br or I and

R is a hydrocarbon chain of at least seven carbon atoms, in a solvent which solvates said complex; and (ii) drying said silica; thereby eliminating said solvent and groups X to form residue molecules of said complex, forming permanent Cr—O—Cr bonds between the adjacent residue molecules of said complex and permanent Cr—O—Si bonds between residue molecules of said complex and said surface of the particulate silica.

2. A method as claimed in claim 1 in which R is a hydrocarbon chain of at least 12 carbon atoms.

3. A method as claimed in claim 1 in which said solvent is aqueous alcohol.

4. A method as claimed in claim 1, comprising a step of washing the particulate silica after said treating step (i) to remove excess of said solution before said drying step (ii).

5. A particulate amorphous silica chromatography medium obtained by the method of claim 1, having said surface of the particulate amorphous silica rendered nonpolar by a covering layer of said residue molecules of said chromium (III) complex permanently bonded to one another and to said surface of the particulate silica.

* * * * *